United States Patent [19]

Piehl, deceased

[11] 4,106,206
[45] Aug. 15, 1978

[54] POSITIVELY EXPANDABLE AND RETRACTABLE THREAD MEASURING GAGE

[75] Inventor: Otto W. Piehl, deceased, late of Corona Del Mar, Calif., by Julia A. Piehl, legal representative

[73] Assignee: The United States of America as represented by the Secretary of the Navy, Washington, D.C.

[21] Appl. No.: 790,739

[22] Filed: Apr. 25, 1977

[51] Int. Cl.² .............................................. G01B 5/16
[52] U.S. Cl. ............................... 33/199 R; 33/178 R; 33/178 Q
[58] Field of Search ............ 33/199 R, 199 B, 174 Q, 33/178 R, 147 M, 164 C, 174 R

[56] References Cited
U.S. PATENT DOCUMENTS

| | | | |
|---|---|---|---|
| 2,595,917 | 5/1952 | Bath et al. | 33/199 R |
| 3,025,610 | 3/1962 | Baumgartel | 33/199 R |
| 3,369,302 | 2/1968 | Johnson | 33/199 R |
| 3,426,437 | 2/1969 | Rebhun et al. | 33/174 Q |

*Primary Examiner*—Richard E. Aegerter
*Assistant Examiner*—Willis Little
*Attorney, Agent, or Firm*—Richard S. Sciascia; Paul N. Critchlow

[57] ABSTRACT

The gage includes a cam follower formed of a plurality of radially expandable segments each provided with a pair of inclined surfaces riding on a pair of cams carried by an elongate shaft reciprocably mounted in a suitable housing. When reciprocated in one direction one of the cams radially expands the segments. Upon reverse reciprocation, the other cam contracts them. Threads formed on the segments are formed ot mesh with the threads to be measured. A primary function of the gage is to measure the concentric relationship between a cylindrical object and the cylindrical configuration of a threaded end portion of the object. For this purpose, the shaft is floatably supported and, as the threaded segments move into their meshed engagement, it floatably assumes the axis of the threads being measured. When fully meshed, non-contact transducers can measure any inclination of the shaft from an original disposition.

5 Claims, 6 Drawing Figures

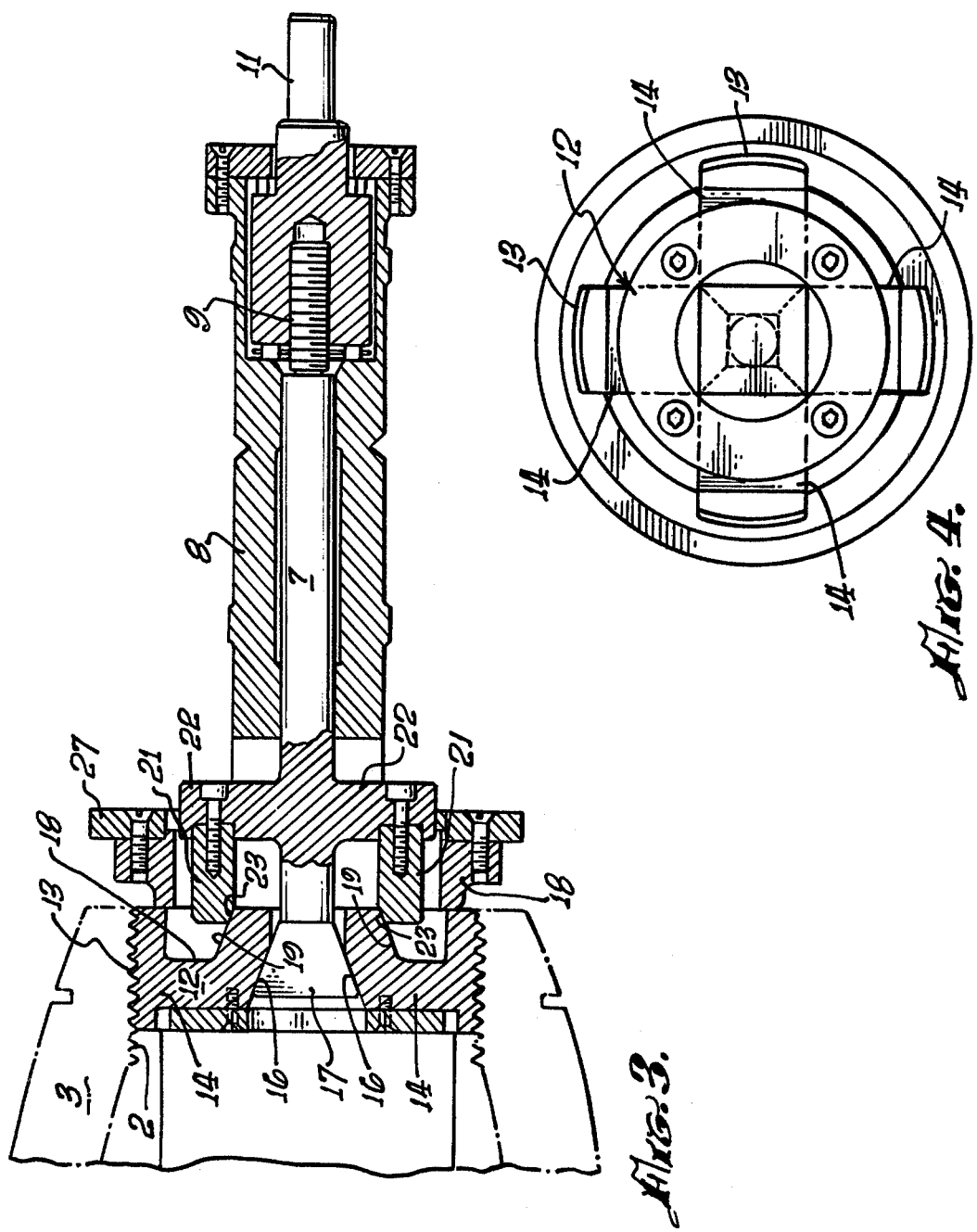

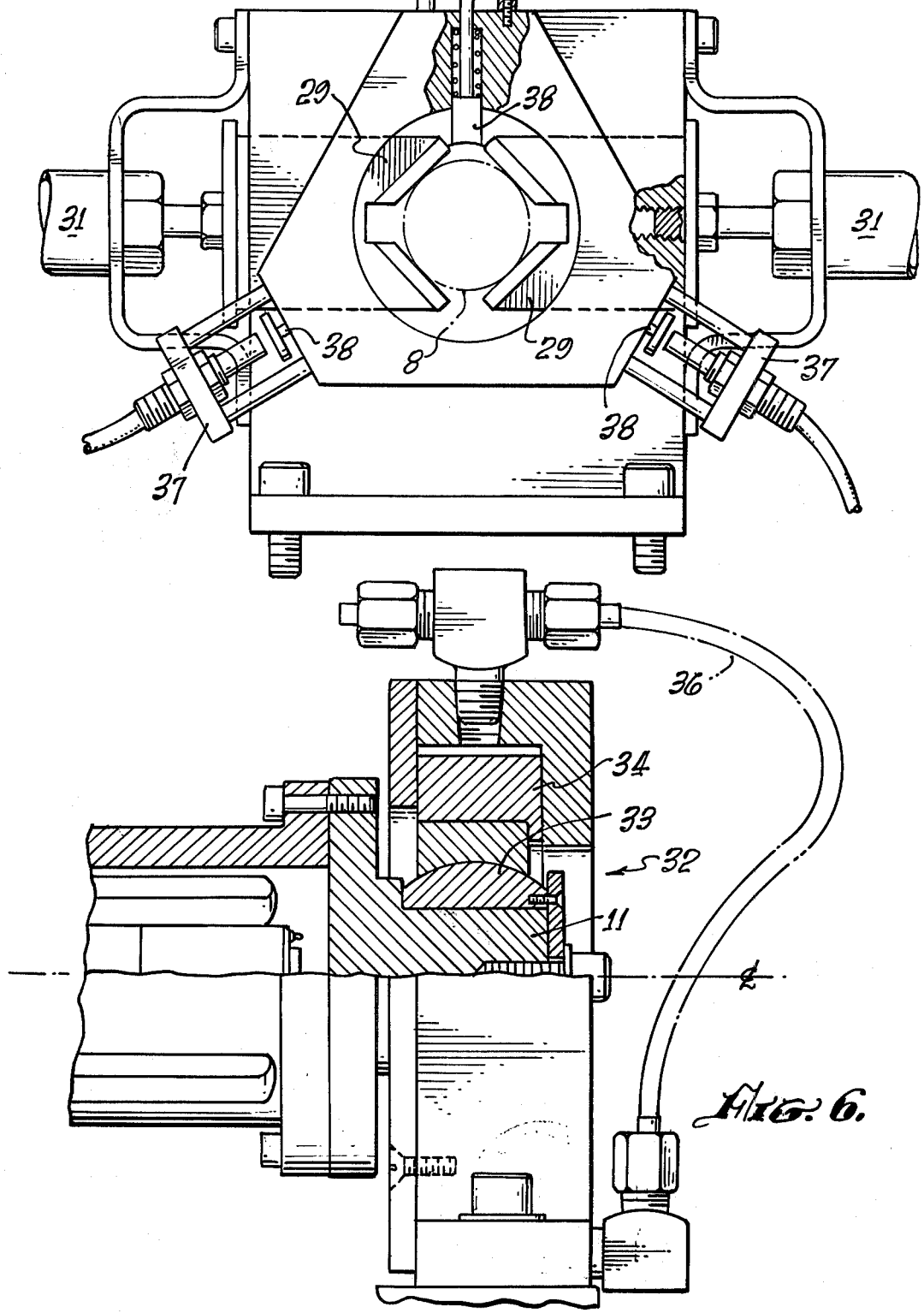

POSITIVELY EXPANDABLE AND RETRACTABLE THREAD MEASURING GAGE

BACKGROUND OF THE INVENTION

The present invention relates to thread measuring gages and, in particular, to positively expandable and retractable gages capable of determining the circularity of a threaded portion of an object.

The nature of the present gage best can be appreciated by considering the manner in which it is used to measure the circularity of threads formed on an end portion of, for example, a 5 inch 38 projectile. Such projectiles generally are in the form of cylindrical casings provided at their end portions with threads into which end fuse fittings or the like can be coupled. In fabricating these casings, great care must be exercised to assure, by means of bourrelet measurements, that the particular casing is truly cylindrical. Equal care also must be exercised to assure that the threaded end of the casing is precisely cylindrical to the extent that the axis of this threaded portion is concentric with that of the casing itself. Any inclination or departure from such a concentric relation results in a corresponding inclination of the coupled fuse relative to the axis of the cylindrical casing itself. Such deviations seriously affect the flight characteristics of the projectile. Gages or the like are employed to assure the precise circularity or, in other words, concentricity with the circularity of the missile itself.

Expandable gages are well known and frequently are formed with exterior threads to mate with the threads being measured. However, most of these gages simply are used to expand into a meshed contact and, as far as is known, they are not suitable for the present circularity measuring. Also, the mechanisms used to expand and contract the gages appear to be relatively complex and, in a number of instances, rather unreliable.

Another important factor to be considered is, obviously, that after a gage has been expanded into a meshed engagement or the like, it then must be contracted in size to permit its removal. Usually, gages of the present type employ some positive force, such as a cam, produce the expansion. However, when removal is desired, reliance then is placed upon some resilient means, such as a spring return, to free it for removal. Unfortunately, spring returns are not too reliable particularly when the meshed contact is so tight as to resist release. As a result, attempts to remove a gage may cause serious thread damage which requires costly and time-consuming repairs. This problem is of particular concern in mass production operations or, in other words, in fabrications in which the gaging operation is automated and remotely controlled rather than being a manually controlled operation. To resolve this problem, it is desirable to provide a gage which is not only positively expandable into thread contact but, in addition, is positively and forcefully retractable from it. The positive retraction force assures full contraction and avoids problems especially, as indicated, in automated operations. Also, as will become apparent, the construction and operation of the present gage provides a number of advantages apart from its capability for providing the concentricity measurements for 5 inches, 38 projectiles and the like.

In general, the present gage is a cam-operated expandable and retractable device in which a cam follower formed of a plurality of segments is provided with a pair of cam surfaces riding on a pair of cams which, in turn, are carried by a reciprocably driven shaft member. Reciprocation in one direction radially expands the follower segments while reciprocation in the opposite direction positively retracts them. The segments themselves are radially-extending members having circumferential edge portions provided with threads adapted to mesh with the threads to be measured. Concentricity measurements are achieved by permitting the shaft member and its housing to float during its final engagement between the segment threads and threads to be measured. Initially, the housing is held in the fixed position by a mechanical support. In this fixed position, it is disposed in an axially aligned relationship with the cylinder or projectile that carried the threads to be measured. As a predetermined point, the mechanical support is withdrawn to permit the floating action. When the thread circularity is faulty, the housing and its shaft tilt or incline away from its initially fixed position into a disposition in which it aligns with the axis of the threads being measured. Transducer means then can be used to determine the degree of the inclination which, of course, would be considered as an error in the thread fabrication.

DETAILED DESCRIPTION OF THE DRAWINGS

The present invention is illustrated in the accompanying drawings of which:

FIG. 3 is a sectional view showing the gage itself operatively engaging a projectile;

FIG. 4 is an end view of FIG. 3 minus the projectile;

FIG. 5 is a view taken along lines 5 5 of FIG. 1 with certain portions broken away to reveal underlying parts, and FIG. 6 is a view taken essentially along lines 6 6 of FIG. 1 with the lower half of the view shown in elevation and the upper half in section.

DETAILED DESCRIPTION OF THE INVENTION

Figure 1:
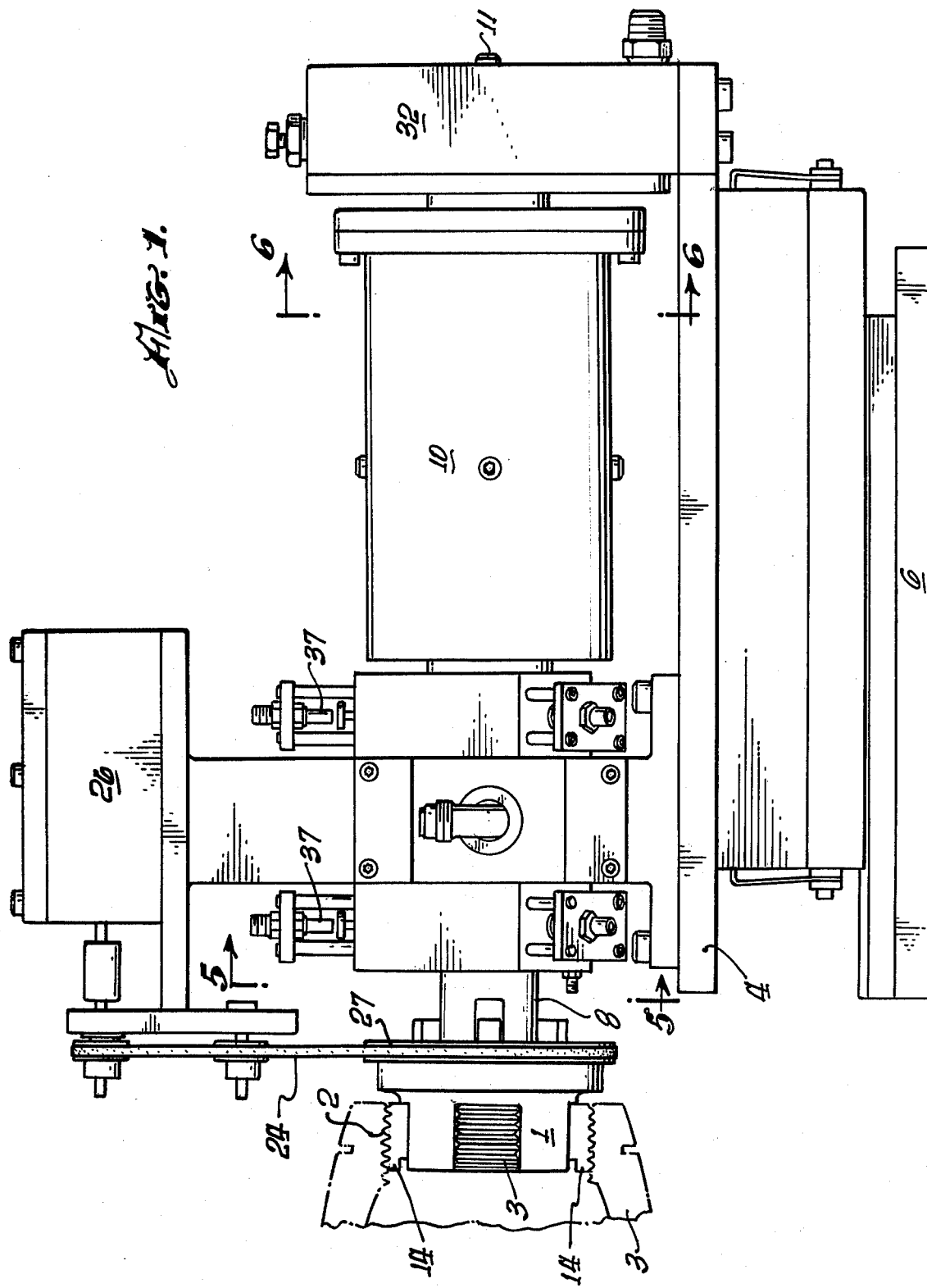
FIG. 1 is a side elevation showing the present gage along with its various support mechanisms and drives mounted on a platform in operative engagement with a threaded end portion of a 5 inch 38 projectile.

Referring to FIG. 1, the present gage, identified by numeral 1, is shown operatively engaging threads 2 of a 5 inch 38 projectile 3. Projectiles of this type customarily are provided with threaded end portions to receive and mount end fittings such as fuses and these fittings, when mounted, must be precisely oriented relative to the circularity of the projectile. In particular, if the fittings lie at an angle to the cylindrical projectile, the behavior of the projectile in flight becomes erratic and the flight pattern unreliable. To assure precise mounting, thread 2 of the projectile must have a circularity that is precisely concentric to the design circularity of the projectile. Any error obviously causes the axis of the mounted fitting member to be canted or, in other words, to lie at an angle to the projectile axis.

FIG. 1 in general, shows a large and rather complex piece of equipment which has been specially designed as a complete system for accomplishing the desired circularity measurements in a fully automatic, remotely controlled and repetitious manner. Automatic gaging, of course, is highly desirable particularly in large scale operations and, to adapt a gage for the automatic systems, it is important that the gage itself function in such a manner that the desired remote controls can be applied in a reliable manner. The present gage is so designed although it also is capable of being hand-operated if desired. Consequently, it should be recognized at the outset that the entire system shown, for example, in FIG. 1 is principally intended to illustrate only one of a number of possible uses of the gage itself.

Figure 2:
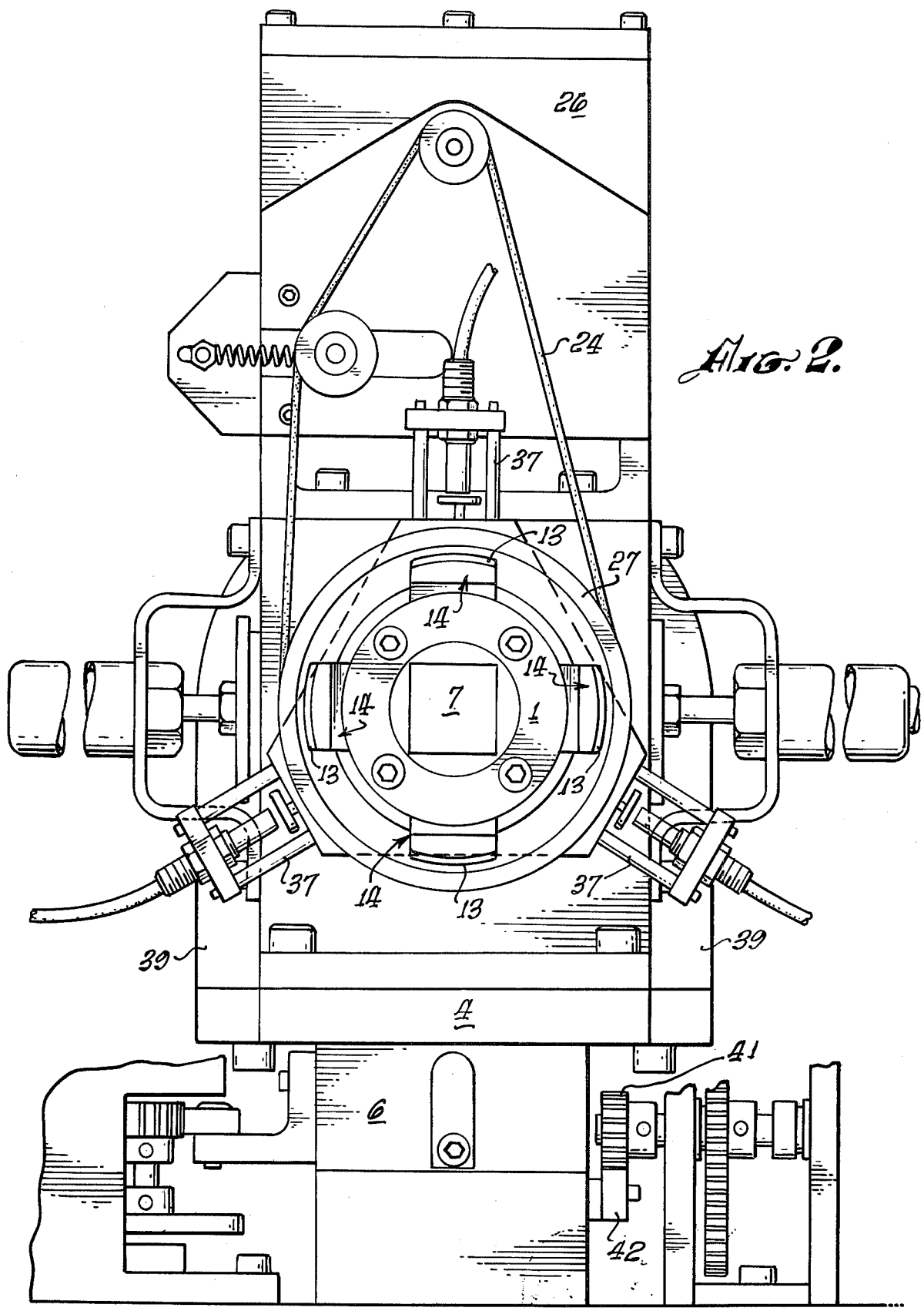
FIG. 2 is an end view of the FIG. 1 apparatus minus the projectile.

With regard to the implementation illustrated in FIG. 1, gage 1, along its various supporting and driving mechanisms, is mounted on a platform 4 which, in turn, is reciprocably supported on a base 6 in a manner best shown in FIG. 2. The rather obvious purpose in the reciprocable mounting is to permit the gage to be moved toward and away from its operative disposition relative to the projectile to be measured. Although not shown, it is intended that the projectile itself be supported and held in a fixed disposition relative to the gage. Specifically, its operative position disposes the projectile in horizontal axial alignment with the gage itself. It further is intended that the entire system include other components which are functionally unrelated to the present gaging function and, consequently, have not been illustrated. For example, it is contemplated that the entire system include a pair of the gage mechanisms shown in FIG. 1 both mounted on rotatable turrets by means of which both gages can be rotated into alignment with both ends of an intervening projectile so that gaging measurements can be conducted simultaneously on both of these ends. More specifically, a pair of turrets are used and each turret also carries other mechanisms or operating stations used in preparing the projectile for the gaging operation. For example, the other stations can include being a cleaning station for removing wax and explosive from the projectile threads, a station for gaging the diametrical size of the fuse cavity and a device for measuring the projectile circularity. All of these operations are intended to be fully automatic so that, once the projectile is properly mounted on its fixed support, the various functions can proceed under remote control.

The structure of the gage itself is shown in FIG. 3. It includes an elongate shaft 7 reciprocably mounted in a circular housing 8 and, as will be noted, the right-hand end of the shaft is formed with a threaded portion 9 meshed with threads formed on a rotatable drive shaft 11. Rotation of shaft 11 by an electric motor 10 (FIG. 1) threadably advances and retracts shaft 7 to produce the desired reciprocations. At its left-hand end, (FIG. 3) the shaft carries a cam-follower 12 which, as shown in the drawing, has its outer circumferential edge portion formed with threads 13 designed to mesh with threads 2 of projectile 3. The reciprocable movements of shaft 7 positively expand follower 12 into engagement with threads 2 of the projectile and, subsequently, positively contract it from the thread engagement. In greater detail, cam-follower 12 is formed of a plurality of cam-following segments 14 (FIG. 4). There are four such segments each formed with its threads 13 and each also formed with a rearwardly inclined cam-following surface 16 (FIG. 3) riding on the left-hand end portion of shaft 7. For this purpose, this end of the shaft is formed with a radially expanded portion 17 that also has rearwardly inclined surfaces mated with those of the cam-following segments. As shown in FIG. 3, this end of the shaft is squared to provide the camming surfaces. When motor 2 drives shaft 11, shaft 7 is reciprocably moved to the right causing the cam segments to expand radially into their illustrated engagement with threads 2 of the projectile.

Retraction of the cam-following segments from the engagement also is accomplished in a cam-activated, positive manner comparable to the expansion. For this purpose, each of the follower segments has its rear wall formed with a recessed portion 18 (FIG. 3) with the lower wall of the recess being inclined rearwardly to provide another cam-following surface 19. Surface 19, in turn, is engaged by a plurality of cam arms 21 also carried by shaft 7. In particular, shaft 7 is formed with four radially extending spoke-like arms 22 with cam arms 21 being bolted to their outer ends and each of these cam arms is formed with an inclined cam surface 23 engaging inclined walls 19 of the follower segments. Reciprocable movement of shaft 7 to the left thus produces a cam action to positively retract segments 13 from their threaded engagements with the projectile.

A further structural feature which can be noted at this point is that the gage also is belt-driven for purposes which will be considered subsequently. In particular, an endless belt 24 driven by a motor 26 engages the gage which, as shown in FIGS. 1 and 3, mounts a belt-driven sheave 27. Functionally, the belt drive is capable of rotating shaft housing 8 along with its shaft 7 with the result that, providing drive shaft 11 of the gage is held in a stationary position, the rotation of shaft 7 again will advance and retract the cam followers.

Other structural components shown in the drawings best can be described in relation to the particular functions which they perform in carrying out the gaging operation or, in other words, in the job of determining the circularity of threads 2 of the 5 inch 38 projectile. As already indicated, circularity is determined by expanding cam follower segments 14 radially to cause their threads to closely mesh with the threads of the projectile and, when so meshed, the axis of shaft 7 or housing 8 should precisely align with the axis of the projectile itself. In other words, the threaded end of the projectile has a circularity which in any way deviates from the circularity of the projectile itself, the meshed engagement of the cam-follower segments of the gage will produce a inclination or cant of the axis of shaft 7 and to its housing. To detect and measure deviations represented by inclinations of the shaft it is necessary to determine the orientation of the housing and shaft prior to the thread engagement and subsequently to again determine the orientation while the threads are so engaged. Certain transducer mechanisms to be described provide the measurements. However, to permit the measurements to be made the gage housing must be initially supported in a fixed measurable position prior to the thread engagement and, of equal importance, it must be permitted to float or move responsively to the thread engagement.

To achieve these purposes, housing 8 and its shaft initially are securely supported in a fixed position by means of air-driven pistons the structure of which is best seen in FIG. 5. Subsequently, as the threads are being engaged, the air-driven pistons are retracted to permit the housing to float. As shown, pistons 29 are reciprocably driven by air cylinders 31 and the operation is remotely controlled in any suitable manner so that piston blocks 29 can be moved inwardly to clamp and hold housing 8 and, at the desired signal, retracted to free the housing and permit it to float. Obviously, other mechanisms can be substituted such, for example, as solenoid-operated clamping blocks or the like.

The capability of the gage to floatably assume the inclination produced by threaded engagement of the gage and the projectile may be achieved by any desired manner. Preferably, it is achieved by the use of a spherical bearing arrangement 32 which, as shown in FIG. 1, is mounted at the right-hand end of the illustrated apparatus where it rotatably journals an extension of drive shaft 11 of the gage. In other words, drive shaft 11 of the gage extends through its drive motor and into the bearing member itself. Details of the bearing structure are shown in FIG. 6 where it will be seen that the end portion of the shaft 11 extension mounts a ball-joint member 33 engaged by an air-pressured thrust block 34 the rear face of which is pressured by an airline 36. When the fixed, clamping support supplied by air-driven pistons 29 is released, the effect is that the entire gage mechanism as shown in FIG. 3 is supported by the spherical bearing which permits the shaft of the gage to tiltably conform to any deviation produced by the threaded engagement of the gage with the projectile.

To measure the degree of any inclination or tilt, sets of so-called non-contact transducer mechanisms 37 are mounted in the manner best shown if FIGS. 2 and 5. As best seen in FIG. 5, each set of these transducers is made up of three individual transducer members each of which has a non-contact arm 38 disposed in close proximity to housing 8. Non-contact transducers are commercially available mechanisms marketed, for example, by Kaman Sciences Corporation of Colorado Springs. As described in a Kaman publication, the transducers operate on an eddy-current loss principle in which magnetic flux lines emanating from active non-contact members, such as arms 38, pass into the surface being measured, i.e., the housing, and, depending upon the displacement of the arms from the housing, the devices measure proportional variations in the eddy current loss. The eddy current loss is in the form of impedance variations which are converted to a D.C. voltage proportional to the distance being sensed. As will be appreciated, the two sets of circumferentially spaced transducers 37 are capable of determining the axial orientation of housing 8 and of detecting inclinations produced by deviations in the circularity of the projectile threads.

As best shown in FIG. 2, transducers 37 are mounted on structural standards 39 which are supported on platform 8 and which form a part of the support frame work for the entire apparatus. Platform 4, as already indicated, is reciprocably supported and the support includes a driven gear 41 meshed with a track 42 (FIG. 2).

In the foregoing discussion, the operation of the present gage has to some extent been considered particularly insofar as the use of the gage to determine the circularity of the threaded end portion of a projectile such as the 5 inch 38 projectile 3. It may however be of some help to briefly review the entire procedure. As a preliminary step, the projectile is mounted on its supporting framework which, as has been indicated, is at a mid-station of the turret-supported gage arrangement. Also, the circularity of the projectile initially is determined by bourrelet measurements. The prime concern is to assure that the circularity of projectile threads 2 is concentric with the projectile itself. To accomplish this purpose, the expandable gage is supported by air-operated piston blocks 29 (FIG. 5) and the support is adjusted to assure that the axis of the gage is precisely concentric to the axis of the projectile threads. The turrets then are rotated to align cam follower 12 of the gage with the threaded openings of the projectile. Platform 4 then is reciprocated to move the expandable cam follower portion of the gage into radial alignment with the projectile threads. Obviously, during such movement, cam follower segments 14 must be in a contracted disposition and, if necessary, motor 10 is driven to move shaft 7 to the left (FIG. 3) to contract the cam follower. When positioned, shaft 7 is driven in the opposite rotational direction causing cam 17 to move rearwardly and expand the cam follower segments radially outwardly into an initial threaded contact with the projectile. At this point in the radial expansion, two events occur. The first of these is that the drive of motor 10 is cut off with the result that the gage shaft and housing are held in a fixed position. Simultaneously, pistons 29 which are providing the fixed support for the gage are withdrawn so that the entire gage then is supported at its left-hand end by its threaded contact with the projectile and, at its right-hand end by the spherical bearing arrangement of FIG. 6. This latter support permits a floating support.

In the next step, cam-follower segments are expanded further into the intimate contact that produces the tilt. At this point, it is preferred to utilize the previously discussed belt drive. The belt rotates the entire gage housing and shaft and, since drive shaft 11 is stationary, the rotation results in a threadable expansion of the cam follower segments. Obviously, the belt drive can rotate the housing in either direction so as to positively produce either in an expansion or a contraction of the segments. The purpose of the belt drive is to provide closer control over the expansion of the segments as they move from their initial contract into their final intimate contact.

The measuring operation of the gage is performed by transducer 37. Prior to any expansion of the segments the transducers have provided a particular reading that represents the desired circularity of both the projectile and its threaded portion. The subsequent reading provided by the transducers is made with the threads in intimate engagement and, since the intimate engagement may produce a tilt in the axis of the gage, any deviation in the reading from that initially provided represents the tilt and provides the desired data.

An important function of the present gage is that, once the measurement has been made, cam-follower segments then can be positively retracted from their threaded engagement. This positive retraction is a distinct advantage in that it avoids frequent difficulties experienced with prior types of expandable gages utilizing resilient spring-return mechanisms to retract the expandable portions of their gages. Contraction of the expanded segments is achieved by again driving shaft 11 in a rotational direction capable of causing shaft 7 to move to the left (FIG. 3). With the segments fully retracted, the entire apparatus is withdrawn from the projectile opening by reciprocating platform 4. The projectile then is removed from its support and another projectile mounted for the next operation.

The operation just discussed obviously is designed particularly to perform one special function and to perform it in a fully automated manner. However, it also should be recognized that the gage, if desired, can be manually operated to perform these or other measurements. For example, by employing some minor modifications, the gage can be utilized for determining thread pitch or, in fact, simply for determining the interior or exterior diameter of a cylindrical object. In other words, although the present gage is particularly advantageous for use in the described operation, there is no intent to so limit its use.

Obviously many modifications and variations of the present invention are possible in the light of the above teachings. It is therefore to be understood that within the scope of the appended claims the invention may be practiced otherwise than as specifically described.

I claim:

1. A positively expandable and retractable thread-measuring gage apparatus comprising:
    an elongate housing member provided with an axial bore,
    an elongate shaft member reciprocably mounted in said bore and having a forwardly disposed driving end,
    means for reciprocably moving said shaft member axially in said bore,
    a first inclined-surface cam means carried by said driving end of the shaft member,
    a second inclined-surface cam means also carried by said shaft member in a position disposed radially outwardly of and in close proximity to said first cam means, and
    a cam follower member carried by said housing, said member being formed of a plurality of segments extending radially outwardly of said housing bore with each having a first inclined surface slidably engaging the inclined surface of one of said cam means and a second inclined surface disposed radially outwardly of said first inclined surface in slidable engagement with the inclined surface of the other cam means, said slidable engagements being disposed in diametrical opposition for supporting said segments and for exerting radially opposite forces on said segments to the extent that when said shaft is moved in one axial direction one of said engagements radially expands said followers while the other permits said expansion and when the shaft is moved in the other direction the other engagement contracts the followers with said one engagement permitting the retraction,
    each of said radially extending segments having an arcuate portion provided with threads matching said threads to be measured, said arcuate portions geometrically forming a circle whereby said gage can be disposed with its threaded segments radially aligned with the threads to be measured and its shaft member moved in opposite directions for expanding and contracting the threaded segments into and out of contact with said threads.

2. The apparatus of claim 1 wherein said shaft member has a rearwardly disposed threaded portion;
    said means for reciprocating said shaft member including:
    a drive shaft having a forwardly disposed threaded portion meshed with said rearwardly disposed threaded portion of the shaft member, and
    means for rotating said drive shaft whereby said shaft member is threadably reciprocated relative to said housing for expanding and contracting said follower segments.

3. The apparatus of claim 1 wherein each segment of said follower member is formed with a radially extending rearward wall provided with a recess, said second inclined surface of each segment being formed on a wall of said recess,
    said second cam means having a rearwardly tapering surface operatively engaging said inclined surface of said recess, and
    said first cam means being formed by a radially expanded forward portion of the shaft member for providing a rearwardly tapering cam surface operatively engaging each of said first inclined surfaces of said follower member segments,
    said cam engagements producing an expansion of the follower member when the shaft member is moved rearwardly and a contraction of said member when the shaft member is moved forwardly.

4. The apparatus of claim 1 wherein the gage is adapted for determining the alignment relationship between the longitudinal axis of an elongate cylindrical object and the axis of threads formed on said object, said apparatus further including:
    a first housing-support means for initially disposing and holding said housing member in a position in which the axis of its shaft member lies in a known alignment relationship with said longitudinal axis of said cylindrical object,
    a second floatable-bearing support means for said housing,
    means for retracting said first support means and permitting said housing and shaft members to be supported solely by said floatable means,
    whereby, as said follower member threads are moved into a tight engagement with the threads of said cylindrical object being measured, said housing and shaft members floatably assume the axis of said threads, and
    means for measuring the inclination of said housing member from its initially supported disposition, said means providing a determination of said alignment relationship between the axes of said cylindrical object and its threads.

5. The apparatus of claim 4 wherein said means for reciprocably moving the shaft member in said housing bore includes:
    a rotatably driven member threadably coupled to said shaft member for translating rotary drive into said reciprocable movements, and
    a rotatable drive means coupled to said drived member;
    said apparatus further including:
    means for decoupling said rotary drive, and
    a second rotatable drive means operable upon said decoupling for advancing and retracting said shaft member at a reduced rate,
    whereby said movement of said follower member threads into tight engagement with the threads of the cylindrical object being measured can be accomplished at said reduced rate.

* * * * *